Figure 2:
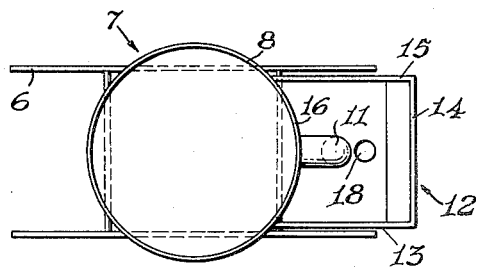

Dec. 2, 1952     J. K. HANEY ET AL     2,620,269
METHOD OF RECOVERING MAGNESIUM ALLOY FROM
COMPOSITE SCRAPPED METAL OBJECTS
Filed Dec. 23, 1948

INVENTORS.
James K. Haney
Ralph M. Hunter
Melvin O. Robinson
BY Griswold & Burdick
ATTORNEYS Patented Dec. 2, 1952

2,620,269

UNITED STATES PATENT OFFICE 2,620,269

METHOD OF RECOVERING MAGNESIUM ALLOY FROM COMPOSITE SCRAPPED METAL OBJECTS

Joseph K. Haney, Ralph M. Hunter, and Melvin O. Robinson, Midland, Mich., assignors to The Dow Chemical Company, Midland, Mich., a corporation of Delaware Application December 23, 1948, Serial No. 66,942

4 Claims. (Cl. 75—65)

1

The invention relates to methods of recovering magnesium alloy from scrap metal objects. It more particularly concerns an improved method of recovering the magnesium alloy portions of composite metal objects by subjecting the objects to a melting operation.

Heretofore, little, if any, difficulty has arisen in salvaging magnesium-base alloy from scrap metal parts or objects by conventional melting procedures because the usual run of scrap does not have associated with it non-magnesium parts of metal alloyable with magnesium. In the instances in which non-magnesium metal parts are present in the scrap, it has been customary in salvaging such scrap to subject it to a sorting operation before melting, whereby the magnesium alloy portions of the scrap are selected for melting apart from the non-magnesium metal portions. Pursuant to the second World War a large quantity of fabricated metal structures and various mechanical devices formed in metal have been junked that include in their make-up parts or portions formed of magnesium-base alloy. Examples of such structures are airplane engine castings, such as crank cases, instrument cases, airplane landing wheels, air foils, propeller nose pieces, etc. Much of this scrapped magnesium alloy-bearing metal has associated with it non-magnesium metal parts in many forms, such as, for example, bolts, nuts, rivets, rod, tubing, wire, pins, plugs, bushings, bearings, etc. Some of this non-magnesium metal is not alloyable with magnesium or magnesium alloy, with which it is associated, at the temperatures employed in melting magnesium alloys. For example, iron and steel objects do no alloy nor do they melt if present during the melting of the magnesium alloy scrap and cause no difficulty in the recovery operation. On the other hand, the non-magnesium metal parts formed of metal alloyable with magnesium, and which are heavier than magnesium, readily contaminate the magnesium-base alloy portions when these are subjected to conventional melting operations. Contamination is particularly severe when the non-magnesium alloy portions of the scrap have a low enough melting temperature to become fused while the magnesium alloy portions melt, as when the non-magnesium portions are of zinc, aluminum, aluminum-base alloys, lead, tin, alloys of these metals, and like melting magnesium-alloyable metal. Attempts to separate the non-magnesium portions from the scrapped objects before melting have not been generally successful because it is difficult, if not impossible, not to overlook some non-magnesium portions, especially when these are in the form of an insert about which the magnesium alloy portion has been cast. In any event sorting is laborious, time consuming, and uncertain in its results.

Insofar as we are aware, there is no commercially satisfactory apparatus for and method of reclaiming the magnesium alloy values from composite metal objects in which the magnesium alloy portions are associated with non-magnesium alloy portions formed of metal alloyable with magnesium.

Accordingly, the principal object of the invention is to provide an apparatus for and method of reclaiming the megnesium alloy values in composite objects of metal, parts of which are formed of magnesium alloy. Other objects and advantages will appear as the description of the invention proceeds. The invention is fully described in the following specification and annexed drawing describing and illustrating a preferred embodiment of the invention.

In carrying out the invention, the scrapped objects to be reclaimed are melted in a saline flux suitable for melting magnesium-base alloys, such as the saline flux conventionally used in the magnesium foundry. The specific gravity of the flux is adjusted, if necessary, as in conventional melting practice with magnesium alloys, so that the molten flux is just a little more dense than the magnesium-base alloy to be recovered. The usual foundry flux for magnesium alloys comprises magnesium chloride about 31 to 37 per cent by weight, barium chloride about 8 to 11 per cent, sodium chloride up to about 8 per cent, calcium fluoride about 1.5 to 3.5 per cent, the balance being not less than about 43 per cent of potassium chloride. This flux is generally heavy enough to float all the usual magnesium-base alloys, especially when the higher concentrations of barium chloride are used. The flux of suitable density is heated to and maintained at a temperature between 670° C. and 850° C. so that the flux is hot enough to melt some or all the heavy metal portions of the scrap alloyable with magnesium, as well as the magnesium alloy portions. The scrap to be reclaimed is placed in a melting zone within the body of the fused flux, which preferably is caused to flow gently past the charge of scrap to be reclaimed. The heated flux conveys heat to the scrap metal, which thereby becomes heated, and the magnesium alloy portions melt, as well as the heavy metal portions that are fusible at the temperature employed. The resulting molten magnesium alloy is carried away from the scrap by the flux, and being lighter than the flux, rises to the surface of the flux body, where the flux and molten magnesium alloy may be withdrawn and separated from each other and the separated flux returned to the flux body. In the event that the scrap includes non-magnesium metal which is fusible at the temperature at which the melting operation is conducted, the non-magnesium metal is permitted to sink through the flux body out of the way of the melting scrap, which is maintained submerged in the melting zone in the flux until all the fusible portions have melted. The rate and direction of movement of the flux body is limited to the extent necessary to prevent the non-magnesium metal portions of the scrap from being carried upward with the rising molten magnesium portions.

Figure 1:
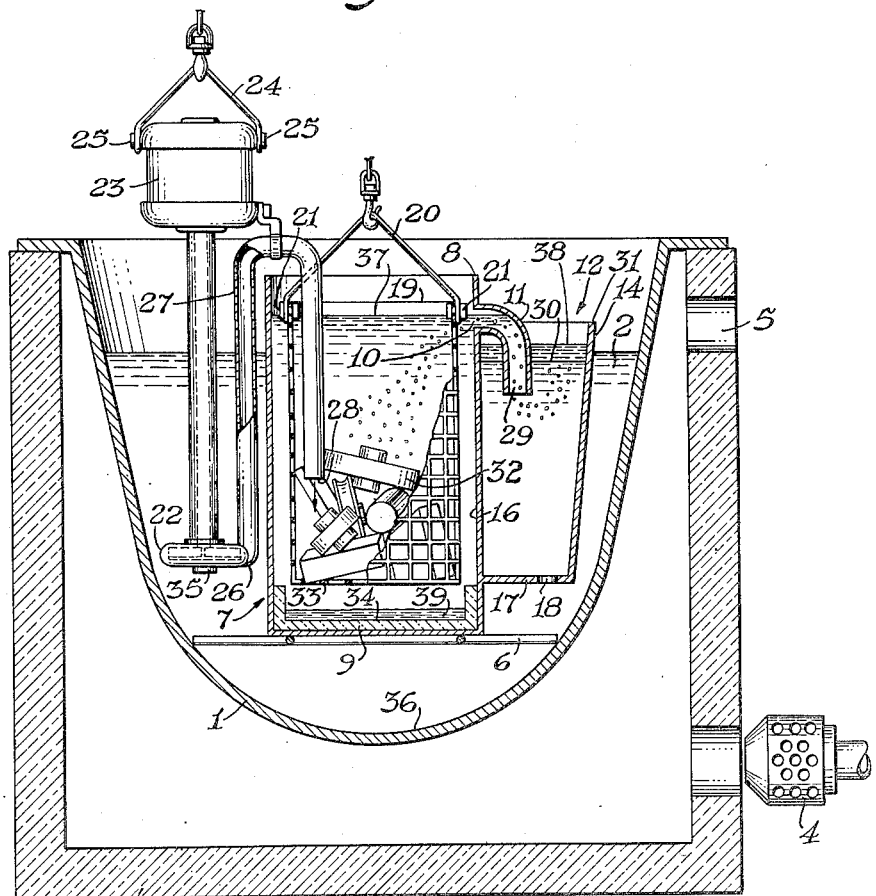

The invention may be further illustrated by reference to the accompanying drawing, in which Fig. 1 is a schematic, partly sectional view in elevation of apparatus as arranged in carrying out the method of the invention. Fig. 2 is a plan view of a portion of the apparatus of Fig. 1. In the two figures like numerals designate like parts.

In the drawing there is shown a melting pot 1 adapted to hold a bath 2 of fused saline flux in which the scrap is melted. The pot is arranged in the furnace setting 3, which is heated by the burner 4. The combustion gases are vented from the setting through the flue 5. Held on the grid 6 within the melting pot is a melting compartment, indicated generally by numeral 7, in which is located the melting zone. This comprises the melting vessel 8, which may be made of steel plate, for example, the lower portion of which is preferably lined with a refractory coating or lining 9 to protect the vessel from attack by aluminum and its alloys when melts of these metals collect therein. Near the top of the vessel 8 is an outlet 10 which is provided with a downwardly extending spout 11. On the side of the melting compartment having the spout 11 is attached the separating chamber, indicated generally by numeral 12. As shown, the chamber 12 is defined by the three walls 13, 14, 15, a portion 16 of the chamber 12 and the bottom 17, which is provided with an opening 18. Within the chamber 8 is suspended the basket 19 by the bail 20, which is attached to the trunnions 21. The basket may be formed of wire mesh or perforated plate, for example, so as to permit free circulation of flux through the basket and passage of fused heavy metal therefrom toward the bottom of the chamber. A pump 22 driven by motor 23 is suspended in the flux bath outside the vessel 8 by the bail 24, secured to the motor 23 by trunnions 25. Attached to the outlet 26 of the pump is the conduit 27, the open end of which terminates in a downwardly directed outlet 28 adapted to extend into the basket 19 in the vicinity of the charge of scrap 32.

In carrying out the method using the foregoing apparatus, a charge of flux is introduced into the pot 1 in amount sufficient to fill the vessel 8 to opening 10 and the pot 1 as well as the chamber 12 to a level 30 above the outlet 29 of spout 11 when the compartment 7 and attached chamber 12 is in place upon the grid 6, this level being below the rim 31 of chamber 12. The flux is maintained at a temperature between 670° C. and 850° C., as by the burner 4. A quantity of scrap metal to be reclaimed is introduced into the basket 19 to form the charge 32 and the basket is suspended within the vessel 8 so that the bottom 33 is a few inches above the surface 34 of the refractory lining 9. The pump 22 is placed in position in the flux bath so that the outlet 28 from the conduit 27 is within the basket 19 and in the vicinity of the charge 32. The inlet 35 of the pump is placed well above the bottom 36 of the pot so that any dross which settles to the bottom of the pot 1 is not circulated by the pump. The pump circulates flux from the main body thereof in the pot 1 into the basket 19, which is in the melting zone, against a charge of scrap metal objects 32 therein. The flux circulates past the scrap, causing those portions of it to melt which fuse at the temperature to which the flux is heated. The fused magnesium alloy portions are carried away from the heavy metal portions in globules by the moving flux, and, being lighter than the flux, rise to the surface 37 and move toward and through the outlet 10 with the flux, which overflows through the spout 11. The globules of molten magnesium alloy are discharged from spout 11 with the flux circulated by the pump into the separating chamber 12, where the globules rise to the surface 30 of the flux, forming a floating layer or pool of molten alloy 38. The flux introduced into the chamber 12 with the magnesium alloy passes out of the chamber through the opening 18, mingles with the flux in the pot 1, becomes heated, and the heated flux is recirculated by the pump until all the magnesium alloy portions of the scrap are melted and moved into the separating chamber for collection. The molten magnesium alloy is ladled or otherwise removed from chamber 12.

While the magnesium alloy portions fuse and rise in the flux in chamber 8 as aforesaid, the heavy metal portions of the scrap, which may be fusible at the temperature of the flux, also melt and sink through the basket to the bottom of vessel 8, forming a pool 39. Any portions which are not fusible at the operating temperature, for example, steel parts such as bolts, studs, fastenings, etc., collect upon the bottom 33 of the basket. From time to time, as for example, after a basket full of scrap has ben treated, the pump may be stopped and lifted out of the flux and then the basket withdrawn from the melting zone and the accumulated unfused material, if any, dumped out of the basket. Also, the compartment 7 with its attached chamber 12 may be removed from the flux bath and the accumulated melted heavy metal 39 in the bottom removed, after decanting off the flux, which may be returned to the pot 1.

The operations of charging the basket and melting the scrap may be repeated a number of times with the same flux when the scrap to be reclaimed is not excessively contaminated with foreign matter. In the event that the globules of molten magnesium alloy do not readily separate from the flux in chamber 12, as when the flux becomes excessively contaminated, the used flux may be replaced with fresh flux.

The rate at which the flux is circulated into and out of the melting zone may vary over wide limits. For example, in a melting zone having a volume of about 100 gallons (e. g. the space in the vessel 8) the flux may be pumped into it at the rate of from about 2 to 30 gallons per minute. At these rates of flow the flux is detained in the melting zone (e. g. vessel 8, assuming it to be empty of metal to be melted) for about 3 to 50 minutes, and the average rate of upward movement of the flux in the melting zone is from about 0.05 to 0.8 foot per minute for a zone having a horizontal cross section of 5 square feet. Rates of upward movement of the flux which result from the introduction of flux into the melting zone and withdrawing the flux from the upper surface, as shown of from about 0.05 to 0.8 foot per minute have been found to carry the molten magnesium-base alloy upward and away from the objects undergoing melting at a sufficient rate to prevent this metal from becoming significantly contaminated with the fusible magnesium-alloyable heavy metal portions of the objects while these melt. The fused heavy metal portions readily settle to the bottom of the melting zone in spite of the upward current of flux.

It is to be noted that by the foregoing method it is possible to recover separately not only the magnesium alloy portions of the scrap charge but also the non-magnesium heavy metal portions, and of the latter, the portions fusible at the operating temperature may be segregated from the portions which do not fuse at the operating temperature. The nonfusible portions usually include the ferrous metal parts and parts composed of copper, nickel, and some of their alloys, depending upon their melting points. The fusible non-magnesium portions are generally those parts which in the scrap were formed of aluminum, aluminum-base alloys, zinc, and some of the zinc alloys or other metals fusible at the operating temperature. All the metals which are heavier than magnesium and the magnesium-base alloys are termed herein heavy metals.

The following table sets forth data regarding a number of instances of the practice of the method on scrap castings comprising portions formed of a conventional magnesium alloy and non-magnesium metal portions alloyable with magnesium. The magnesium alloy portions of the scrap castings conformed to the following specification: aluminum 5.3 to 6.7 per cent, manganese 0.1 to 0.2 per cent, zinc 2.5 to 3.5 per cent, silicon not over 0.3 per cent, copper not over 0.05 per cent, nickel not over 0.01 per cent, other elements not over 0.3 per cent, remainder magnesium. The non-magnesium metal portions were of steel, copper, aluminum, and brass. The scrapped castings treated were contaminated to an undetermined extent with oil, grease, and common dirt. With each batch treated the rate of circulation of the flux was such that there was produced in the melting zone, which had a horizontal cross section of about 5 square feet, an average rate of upward flow of about 0.7 foot per minute.

Referring to the table, it will be seen that the recovered magnesium alloy is of high quality and conforms to the specification of the magnesium alloy portions of the scrapped castings before the melting operation as regards the content of aluminum, zinc, copper, and silicon.

By the foregoing method the magnesium alloy recovered is of high quality in spite of being melted in the presence of metals that are readily alloyable with magnesium, especially in the molten state.

We claim:

1. The method of melting scrapped composite metal objects comprising a plurality of parts, at least one of said parts consisting of a magnesium-base alloy having a magnesium content of at least 80 per cent by weight and another of said parts consisting of a heavy metal alloyable with magnesium and fusible at the temperature employed in the melting of the magnesium-base alloy which comprises submerging the scrapped metal object in a melting zone within and in contact with the flux of a fused saline flux bath, said fused saline flux having a density sufficient to float the magnesium-base alloy when fused but insufficient to float the heavy metal when fused and being maintained at a temperature sufficient to melt both the magnesium-base alloy and heavy metal, supporting the said object within the zone above the bottom of the said flux bath a distance sufficient to permit the heavy metal part when fused to settle below the said object, whereby the magnesium alloy part fuses and the resulting globules of fused magnesium alloy rise to the surface of the flux in the melting zone and float thereon while the heavy metal fuses and settles, withdrawing molten flux from the flux bath outside the melting zone and introducing the so withdrawn flux into the melting zone so as to bring the flux so introduced into contact with the objects to be melted, withdrawing molten flux from the surface of the flux in the melting zone and together therewith molten magnesium-base alloy floating thereon, separating the flux so withdrawn from the magnesium alloy, and returning the so separated flux to the flux bath outside the said melting zone.

2. The method of melting scrapped composite metal objects comprising a plurality of parts, at least one of said parts consisting of a magnesium-base alloy having a magnesium content of at least 80 per cent by weight, and another of said parts consisting of a heavy metal alloyable with magnesium and fusible at the temperature employed

| Batch No. | Lbs. Scrap Treated | Lbs. Magnesium Alloy Recovered | Lbs. Non-Magnesium Metal Recovered | Lbs. Charge Lost | Temp., °C. | Analysis of Magnesium Alloy Recovered in Percent [1] | | | | |
|---|---|---|---|---|---|---|---|---|---|---|
| | | | | | | Al | Mn | Zn | Cu | Si |
| 1 | 325 | 234 | 53 | 38 | 740–670 | 6.7 | 0.12 | 2.7 | 0.03 | 0.08 |
| 2 | 660 | 429 | 209 | 22 | 740–690 | 6.7 | 0.13 | 2.7 | 0.03 | 0.02 |
| 3 | 117 | 98 | 16 | 3 | 740–670 | 6.0 | 0.20 | 3.1 | 0.016 | |
| 4 | 292 | 176 | 70 | 46 | 740–670 | 6.4 | 0.13 | 2.9 | 0.05 | 0.12 |
| 5 | 100 | 82 | 7 | 11 | 740–670 | 6.0 | 0.14 | 3.1 | 0.04 | 0.08 |
| 6 | 98 | 75 | 19 | 4 | 740–670 | 6.2 | 0.14 | 3.0 | 0.04 | 0.09 |

[1] Balance magnesium containing not over 0.3% of other elements.

In the column headed "Lbs. charge lost" there is set forth the difference in weight between the weight of the charge, i. e. the pounds of metal treated, and the sum of the weights of the recovered magnesium alloy and the non-magnesium metal. This difference includes combustible contaminants such as oil and grease which burn during the melting operation, and losses due to oxidation of metal.

in the melting of the magnesium-base alloy which comprises submerging the scrapped metal object in a melting zone within and in contact with the flux of a fused saline flux bath, said fused saline flux having a density sufficient to float the magnesium-base alloy when fused but insufficient to float the heavy metal when fused, supplying heat to the said flux so as to maintain it at a temperature sufficient to melt both the magnesium-base alloy and heavy metal, supporting the said object within the zone above the bottom of the said flux bath a distance sufficient to permit the heavy metal part when fused to settle below the said object, whereby the magnesium alloy part fuses and the resulting globules of fused magnesium alloy rise to the surface of the flux in the melting zone and float thereon while the heavy metal fuses and settles, withdrawing molten flux from the flux bath outside the melting zone and introducing the so withdrawn flux into the melting zone so as to bring the flux so introduced into contact with the objects to be melted, withdrawing molten flux from the surface of the flux in the melting zone and together therewith molten magnesium-base alloy floating thereon, separating the flux so withdrawn from the magnesium alloy, and returning the so separated flux to the flux bath outside the said melting zone.

3. The method of melting scrapped composite metal objects comprising a plurality of parts, at least one of said parts consisting of a magnesium-base alloy having a magnesium content of at least 80 per cent by weight and another of said parts consisting of a heavy metal alloyable with magnesium and fusible at the temperature employed in the melting of the magnesium-base alloy which comprises submerging the scrapped metal object in a melting zone within and in contact with the flux of a fused saline flux bath, said fused saline flux having a density sufficient to float the magnesium-base alloy when fused but insufficient to float the heavy metal when fused and being maintained at a temperature sufficient to melt both the magnesium-base alloy and heavy metal, supporting the said object within the zone above the bottom of the said flux bath a distance sufficient to permit the heavy metal part when fused to settle below the said object, whereby the magnesium alloy part fuses and the resulting globules of fused magnesium alloy rise to the surface of the flux in the melting zone and float thereon while the heavy metal fuses and settles, continuously withdrawing a stream of molten flux from the flux bath outside the melting zone and passing the so withdrawn flux into the melting zone into contact with the object therein to be melted, continuously overflowing flux from the melting zone and together therewith the globules of molten magnesium alloy floating in the flux as the stream of molten flux is introduced into the melting zone, separating the molten magnesium alloy from the flux so overflown from the melting zone, and continuously returning the so separated flux to the flux bath outside the melting zone.

4. The method of melting scrapped composite metal objects comprising a plurality of parts, at least one of said parts consisting of a magnesium-base alloy having a magnesium content of at least 80 per cent by weight, and another of said parts consisting of a heavy metal alloyable with magnesium and fusible at the temperature employed in the melting of the magnesium-base alloy which comprises submerging the scrapped metal object in a melting zone within and in contact with the flux of a fused saline flux bath, said fused saline flux having a density sufficient to float the magnesium-base alloy when fused but insufficient to float the heavy metal when fused, supplying heat to the said flux so as to maintain it at a temperature sufficient to melt both the magnesium-base alloy and heavy metal, supporting the said object within the zone above the bottom of the said flux bath a distance sufficient to permit the heavy metal part when fused to settle below the said object, whereby the magnesium alloy part fuses and the resulting globules of fused magnesium alloy rise to the surface of the flux in the melting zone and float thereon while the heavy metal fuses and settles, continuously withdrawing a stream of molten flux from the flux bath outside the melting zone and passing the so withdrawn flux into the melting zone into contact with the object therein to be melted, continuously overflowing flux from the melting zone and together therewith the globules of molten magnesium alloy floating in the flux as the stream of molten flux is introduced into the melting zone, separating the molten magnesium alloy from the flux so overflown from the melting zone, and continuously returning the so separated flux to the flux bath outside the melting zone.

JOSEPH K. HANEY.
RALPH M. HUNTER.
MELVIN O. ROBINSON.

REFERENCES CITED

The following references are of record in the file of this patent:

UNITED STATES PATENTS

| Number | Name | Date |
|---|---|---|
| 1,180,435 | Robison | Apr. 25, 1916 |
| 1,522,765 | Wilke | Jan. 13, 1925 |
| 1,754,788 | Gann | Apr. 15, 1930 |
| 2,074,806 | Por | Mar. 23, 1937 |
| 2,124,957 | Schichtel | July 26, 1938 |
| 2,214,611 | Greenberg | Sept. 10, 1940 |
| 2,349,190 | Newhams | May 16, 1944 |
| 2,391,516 | Richards et al. | Dec. 25, 1945 |
| 2,468,660 | Gjedebo | Apr. 26, 1949 |
| 2,493,391 | Chew | Jan. 3, 1950 |

FOREIGN PATENTS

| Number | Country | Date |
|---|---|---|
| 346,271 | Great Britain | Apr. 7, 1931 |
| 565,590 | Great Britain | Nov. 16, 1944 |